United States Patent [19]

Takahashi

[11] Patent Number: 4,785,388
[45] Date of Patent: Nov. 15, 1988

[54] GATE PULSE GENERATOR FOR THYRISTOR CONVERTER

[75] Inventor: Tadashi Takahashi, Kawasaki, Japan

[73] Assignee: Kabushiki Kaisha Toshiba, Kawasaki, Japan

[21] Appl. No.: 114,759

[22] Filed: Oct. 30, 1987

[30] Foreign Application Priority Data

Dec. 18, 1986 [JP] Japan .................. 61-302388

[51] Int. Cl.$^4$ ............................................. H02H 7/125
[52] U.S. Cl. ........................................ 363/68; 363/54; 363/128; 357/38; 323/902
[58] Field of Search ............... 363/34, 35, 37, 52–54, 363/68, 84, 85, 128, 129, 41; 357/22, 30, 38; 323/207, 902

[56] References Cited

U.S. PATENT DOCUMENTS

| | | | |
|---|---|---|---|
| 4,274,135 | 6/1981 | Rosa et al. | 363/68 |
| 4,320,445 | 3/1982 | Kobayashi et al. | 363/54 |
| 4,489,372 | 12/1984 | Hatano et al. | 363/54 |
| 4,536,816 | 8/1985 | Matsumura et al. | 363/58 X |
| 4,633,380 | 12/1986 | Kashiwazaki | 363/54 |
| 4,719,551 | 1/1988 | Nishizawa et al. | 363/41 |

OTHER PUBLICATIONS

K. Murabayashi, "Development of a 500KV Light-Triggered Thyristor Valve for HVDC Transmission", International Conference, MONTECH '86, IEEE, Sep. 1986, pp. 1–7.

*Primary Examiner*—Patrick R. Salce
*Assistant Examiner*—Emanuel Todd Voeltz
*Attorney, Agent, or Firm*—Foley & Lardner, Schwartz, Jeffery, Schwaab, Mack, Blumenthal & Evans

[57] ABSTRACT

In a gate pulse generator for a thyristor converter of the type in which in order to fire thyristors of the thyristor converter in which each arm is comprised of a plurality of series-connected thyristors, the gate pulses are generated in response to the gate command signal and the thyristor forward voltage signal and are converted into the light signals which in turn are transmitted to the thyristor converter, whether or not the forward voltage signal exists when the gate command signal is generated is detected and when the forward voltage signal is generated prior to the generation of the gate command signal, the pulse duration is narrowed to a minimum required for firing the thyristor. When the forward voltage signal is generated during the time interval in which the gate command signal continues, the differences in time point when the forward voltage signals are generated among the thyristors due to the storage carrier differences therebetween are taken into consideration so that the pulse duration is increased. Therefore, from the standpoint of the frequency of occurrence, the thyristors can be fired in response to the pulse signal with a narrow pulse duration in almost all cases.

18 Claims, 4 Drawing Sheets

GATE PULSE GENERATOR FOR THYRISTOR CONVERTER

BACKGROUND OF THE INVENTION

1. Field of the Invention

The present invention relates to a gate pulse generator for controlling the triggering of a thyristor converter used in the direct-current transmission and more particularly to a gate pulse generator for a thyristor converter in which in order to fire thyristors of the thyristor converter in which each unit arm is composed of a plurality of series-connected thyristors, a gate pulse signal is generated in response to a gate command signal and a thyristor forward voltage signal and is converted into a light signal which in turn is transmitted to the thyristor converter.

2. Description of the Prior Art

In general, high-voltage thyristor converters used for direct-current transmission have a high voltage rating and a high current rating so that a unit arm comprises a plurality of unit thyristors connected in series or series-parallel. In this case, in order to attain the object of the series or series-parallel connections, gate triggering means must be so designed and constructed as to trigger a plurality of thyristors simultaneously. Furthermore, since a plurality of series-connected thyristors are at different potential levels, triggering means for respective series-connected thyristor units must be isolated from each other. As a result, recently light triggering methods utilizing optical transmission systems with a high degree of electrical isolation capability as well as a fast response have been widely used.

In the case of the light triggering method utilizing a light transmission system, on a high-voltage-side a pulse amplifier must be provided for converging a light pulse signal transmitted from the ground side to the high voltage side into an amplified electrical signal, thereby triggering all the thyristors in each arm of the thyristor converter. Furthermore a gate power supply circuit must be provided in order to supply the power for operating the pulse amplifier. The power for operating the gate power supply circuit is supplied through a snubber circuit (or a DC voltage grading resistor) provided for each thyristor. The capacity of the gate power supply circuit is dependent on the value (peak value) of a gate current to be supplied to each thyristor, a pulse duration and a number of pulses (normally one pulse per cycle and two or more pulses per cycle in the transient state). On the otherhand, the capability of supplying the power to the pulse amplifier is determined by the impedance of the snubber circuit and the capacitance of a capacitor connected to the power input side of the pulse amplifier in order to compensate for an instantaneous power supply failure. Moreover in order to ensure the stable supply of the gate current to each thyristor, the relation that the ability of supplying the input energy to the gate power supply circuit is higher than the output energy therefrom must be maintained.

It follows therefore that in order to make the gate power supply circuit compact in size, it is very important to decrease the required power capacity of the pulse amplifier to a minimum. However, it is necessary that the turn-on time interval of each thyristor must be shortened so as to reduce the variations in turn-on time of the thyristors so that it is impossible to reduce the value of the gate current to an extremely low level. Moreover, the number of pulses of the gate current is dependent upon the operation conditions of the system and is normally one pulse per cycle, but the capability of generating two or more pulses per cycle is required in the transient state.

Next, the prior art method for determining a time width of the gate current which affects the capacity of the high-voltage-side pulse amplifier will be described.

In order to investigate the gate pulse generation modes, the following three operation modes of the thyristor converter are considered:

(a) Mode A: a mode in which the thyristor converter operates normally as a rectifier or an inverter;

(b) Mode B: a mode in which the thyristor converter operates as a rectifier or an inverter and a direct current flows interruptedly; and (c) Mode C: a mode in which when the thyristor converter operates as an inverter and a margin angle of commutation becomes insufficient, the forced trigger protection is effected.

In the case of the operation of the converter, the gate pulse generation modes can be fundamentally divided into the above-described modes A, B and C. Meanwhile, when the direct current is lowered almost to zero (but, unlike the case of the mode B, the direct current flows without interruption), the thyristor can be turned off. However, in this case, from the standpoint of supplying a retriggering pulse, the above-described phenomenon is substantially similar to the interruption of the direct current so that it may be regarded as the interruption of the direct current for the sake of convenience in analysis as will be described below.

Of the above-described three modes, in the mode B two gate pulses are generated per cycle while in the modes A and C only one gate pulse is generated per cycle. The normal operation corresponds to the mode A while the modes B and C temporarily result due to the external disturbance on the system. Especially the mode C results due to temporary phenomena such as the distortions of the system voltage and to an overload so that there exists almost no chance that the mode C results continuously. Therefore in the steady state, only the mode A is taken into consideration.

Next the pulse duration of the gate signal will be discussed. In the case of the mode A, the pulse width may be made very short because all the thyristors can be simultaneously fired, but in the cases of the modes B and C, the time points of the forward voltage generations vary from one thyristor to another due to the storage carrier difference $\Delta Q$ between the thyristors so that the pulse duration must be increased by from several times to tens times as long as the pulse width in the mode A. In the mode A, the forward voltage signals of all the thyristors are already detected when the gate command signal appears so that the unbalanced voltages among the thyristors will not affect the triggering thereof and consequently all the thyristors can be triggered simultaneously. In the mode B, the gate command signal has been generated prior to the detection of the forward voltage signals of the thyristors so that the gate pulse is generated at a time point (the zero voltage point) at which the thyristor voltage most quickly changes from the reverse voltage to the forward voltage; that is, at a time point when the forward voltage is detected first. In this case, there exists a voltage difference due to the storage carrier difference $\Delta Q$ among the thyristors so that a time difference $\Delta t_2$ exists among the zero points of the thyristor voltages. In this connection, in the case of the mode A, a time difference $\Delta t_1$ among the zero voltage points is almost zero. In the mode B, because of the time difference $\Delta t_2$, when the gate pulse is generated by the forward voltage signal of the thyristor which rises quickly, the pulse duration must be selected longer than $\Delta t_2$. As described above, in the mode C, the forced triggering is effected when the margin angle is insufficient in the case of the operation as an inverter. In this case, the phenomenon in the mode C is substantially similar to that in the mode B and when the forward voltage appears first during the time interval when the gate command signal continues due to the insufficient margin angle, the gate pulse is generated. Therefore, even in this case, the thyristor voltages are unbalanced due to the storage carrier difference $\Delta Q$ among the thyristors so that a time difference $\Delta t_3$ exists between the earliest and the latest time points at which the voltage passes the zero point. The value of the direct current Id is greater and also, in the case of commutation, the decrease rate of the current dI/dt is greater in the mode C than in the mode B. The storage carrier difference $\Delta Q$ is greatly dependent upon the direct current Id and its decrease rate dId/dt. That is, the higher the direct current Id and its decrease rate dId/dt, the greater the difference $\Delta Q$ becomes. As a result, $\Delta t_2 < \Delta t_3$ and in the above described three cases, there exists a relation that $\Delta t_1 < \Delta t_2 < \Delta t_3$. Although these differences vary widely depending upon the rating of the converter, the rating of the thyristors, the operating conditions and so on, in the case of the high-voltage converter for the direct-current transmission, the three time differences are as follows:

$\Delta t_1 \simeq 0$ $\Delta t_2 \simeq$ tens microseconds $\Delta t_3 \simeq$ from tens microseconds to hundreds microseconds.

So far the above-described facts are taken into consideration when the pulse duration $T_p$ of the gate pulse (refer to the signals a and b) is determined in accordance with the third case i.e. mode C. In practice, $T_p = 200$–$300$ microseconds.

Meanwhile, the peak value of the current $i_L$ of a light-emitting diode connected to the output of a gate pulse generator is selected hundreds mA$-1$ A in the indirect light triggering system in order to reduce the variations of the gate currents applied to the thyristors. On the other hand, the direct light triggering system in which a converter is composed of light-activated thyristors so that the triggering control is effected directly in response to a light gate signal, the peak value is of the order of a few amperes.

As is well known in the art, the life of light emitting elements such as light-emitting diodes is relatively short so that the conditions for attaining the driving current having a peak value of from hundreds mA to 1 A and a pulse duration of from 200 to 300 microseconds as described above are extremely severe. In this connection, the conditions for firing the thyristors by the above-described prior art gate pulse generator are considerably limited from the standpoint of a life of light-emitting elements and a capacity of a triggering power supply on the high voltage side and therefore present difficult problems in the design and fabrication of the thyristor converters and systems.

SUMMARY OF THE INVENTION

In view of the above, the primary object of the present invention is to provide a gate pulse generator for a thyristor converter which can decrease the power required for firing thyristors to a minimum without adversely affecting the triggering function of the thyristors.

To the above and other ends, in the gate pulse generator for a thyristor converter in accordance with the present invention, when a gate command signal is generated, it is detected whether a forward voltage signal is present or not and when the forward voltage signal appears faster than the gate command signal, a pulse duration is narrowed to such a lower extent required for at least triggering the thyristors, but when the forward voltage signal appears when the gate command signal is present, a pulse duration is increased in consideration of the variations of the generation of the forward voltage signals among the thyristors due to the storage carrier differences among them.

Therefore, from the standpoint of the generating frequency, almost in all the cases, the thyristors can be fired in response to the pulse signals having a narrow pulse duration so that due to the decrease of the duty, the life of light-emitting elements can be drastically increased and the capacity of the triggering power supply on the high-voltage side can be considerably decreased.

The present invention can be equally applied not only to the indirect light triggering type thyristor converters composed of the thyristors triggered in response to the electrical signals but also to the direct light triggering type thyristor converters in which light-activated thyristors triggered in response to the light pulse signals are used.

DETAILED DESCRIPTION OF PREFERRED EMBODIMENTS

Figure 1:
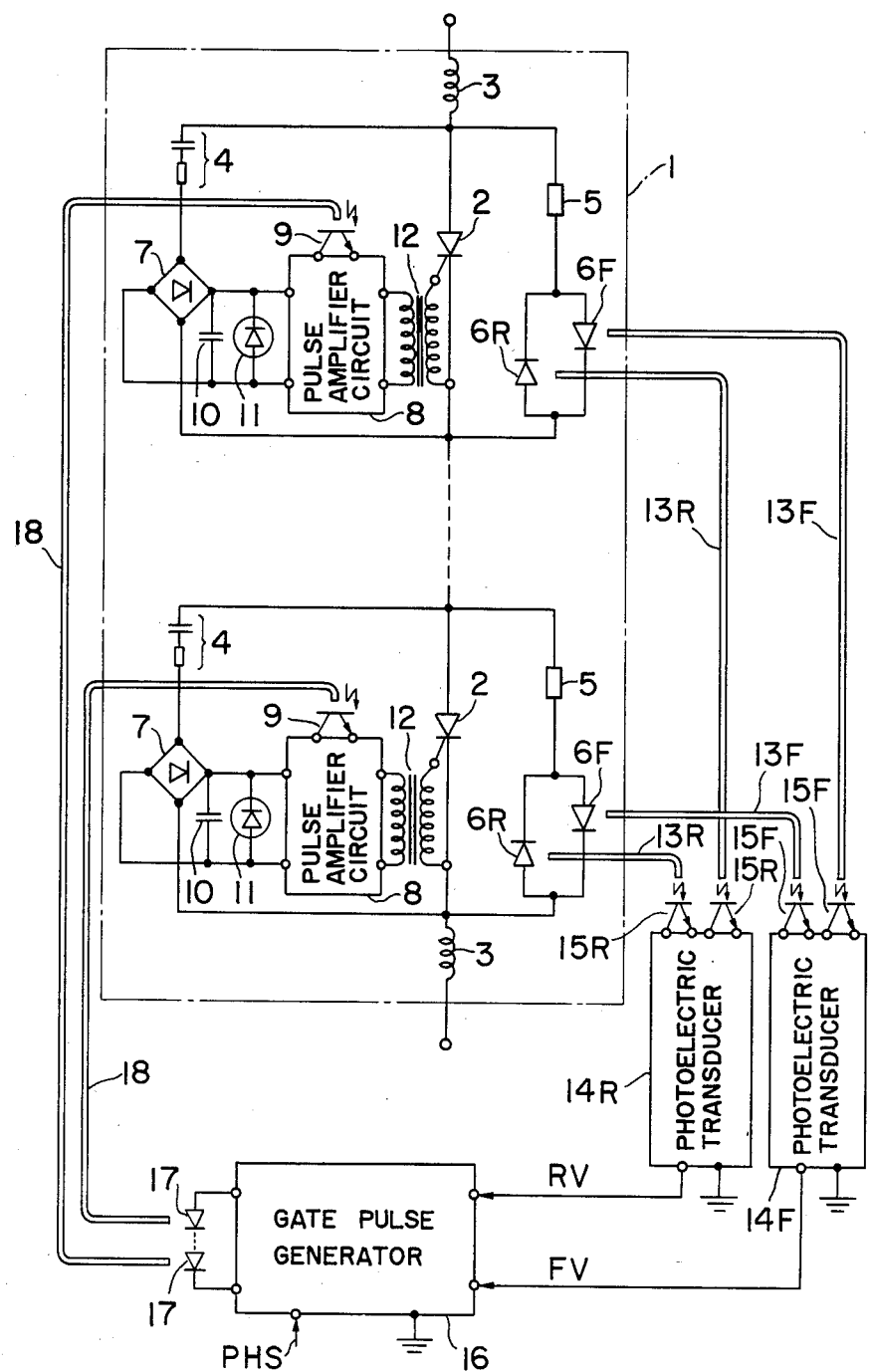
FIG. 1 shows the whole construction of a trigger control device for a thyristor converter in accordance with the present invention.

FIG. 1 shows an indirect light triggering type thyristor converter such as a three-phase bridge connection type thyristor converter embodying the present invention. In FIG. 1, one arm portion of the thyristor converter consisting of a plurality of arms is represented as a thyristor converter 1. The converter 1 has a main circuit consisting of a plurality of series-connected thyristors 2 and serial reactors 3. To each thyristor 2 are connected in parallel a snubber circuit 4 and a DC voltage dividing resistor 5. To the DC voltage dividing resistor 5 is connected in series an anti-parallel-connected pair of light-emitting diodes 6F and 6R as a forward voltage detecting means or as a reverse voltage detector means. In order to obtain a power for triggering the thyristor 2, the snubber circuit 4 is connected in series to a power input of a pulse amplifier 8 through a rectifier 7. A capacitor 10 for compensating for an instantaneous power supply failure and a zener diode 11 for maintaining a constant voltage are interconnected in parallel between the rectifier 7 and the power input of the pulse amplifier 8. The pulse amplifier 8 is provided a phototransistor 9 as a light sensor and when a light pulse illuminates the phototransistor 9, the pulse amplifier 8 generates a gate pulse, thereby triggering through a pulse transformer 12 the thyristor 2.

The output light signals derived from the light-emitting diodes 6F and 6R are transmitted through light guides 13F and 13R and applied to phototransistors 15F and 15R, respectively, incorporated in photoelectric conversion circuits or photoelectric transducers 14F and 14R which are normally maintained at the ground potential. Then the light signals are converted into the electrical signals which in turn are subjected to the logic AND operations and are delivered to a gate pulse generator 16 as a forward voltage signal FV and a reverse voltage signal RV. In response to the forward and reverse voltage signals FV and RV and a gate command signal PHS delivered from a central processing unit (not shown), the gate pulse generator 16 generates the gate pulse signals which in turn are converted into light pulses through light-emitting diodes 17 and applied through light guides 18 to the phototransistors 9 of the pulse amplifiers 8.

Figure 2:
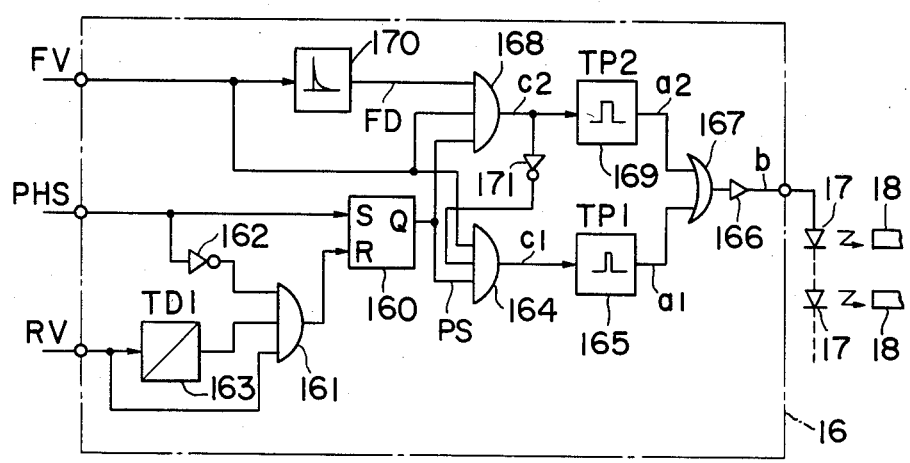
FIGS. 2, 4 and 6 are detailed block diagrams, respectively, of different gate pulse generators shown in FIG. 1.

FIG. 2 shows the interior construction of the gate pulse generator 16 shown in FIG. 1. The gate pulse generator 16 generates a gate trigger signal with a relatively narrow pulse width when the forward voltage signal FV appears during the time interval of the signal PS corresponding to the gate command signal PHS. The gate command signals PHS (which are angularly spaced apart from each other by an angle of 120° in the case of the three-phase bridge type thyristor converter) set a flip-flop 160 and when a margin angle (a time interval of the reverse voltage immediately after the conduction which is detected by the reverse voltage signal RV) is longer than a set value TD1 associated with the turn-off time of the thyristor, the flip-flop 160 is reset in response to the output from the AND gate 161. The gate command signal PHS inverted by an inverter 162, the reverse voltage signal RV and a signal which is obtained by delaying by the set point TD1 the reverse voltage signal RV through an on-delay circuit 163 are applied to the AND gate 161. When the margin angle is less than the set value TD1, no AND output signal is derived from the AND gate 161 so that the flip-flop 160 is not reset and consequently the signal PS continues to exist. The Q output PS from the flip-flop 160, the forward voltage signal FV and the interlocking signal obtained by inverting the output from an AND gate 168 by an inverter 171 are applied to an AND gate 164. In response to the output signal c1 from the AND gate 164 actuates a one-shot multivibrator 165 so that the output pulse signal a1 therefrom has a narrow pulse width TP1 and is applied through an OR gate 167 to a pulse amplifier 166. A pulse signal a2 with a wide pulse width TP2 is applied through a second one-shot multivibrator 169 to an AND gate 168 in another series. The forward voltage signal FV, a signal FD derived from a differentiating circuit 170 and the Q output signal PS from the flip-flop 160 are applied to the AND gate 168. The output signal from the AND gate 168 is represented by c2 while the output signal from the one-shot multivibrator 169 is designated by a2.

The pulse widths TP1 and TP2 of the pulse signals a1 and a2 derived from the one-shot multivibrators 165 and 169, respectively, are selected in a manner to be described below. That is, the pulse width TP1 is selected in correspondence with the turn-on time of the thyristor and is satisfactory when it has 5-10 microseconds even though it varies more or less depending upon the rating of the thyristor. The pulse width TP2 is determined in response to a deviation $\Delta t$ from the zero voltage point due to the storage carrier difference $\Delta Q$ among the thyristors in case of the forced firing at an insufficient margin angle. For instance, when the gate pulse generator is so designed and constructed that the gate pulse is generated in response to the forward voltage signal FV of the thyristor which shows first of all the zero voltage point at which the reverse voltage changes to the forward voltage, the pulse width TP2 is selected 200-300 microseconds.

The output signal b derived from a pulse amplifier 166 becomes the output signal of the gate pulse generator 16 so that the gate trigger current flows through the light-emitting diodes 17. The light-emitting diode 17 converts the applied gate trigger current into a light signal which in turn is transmitted through the light guide 18 to the high voltage side.

Figure 3:
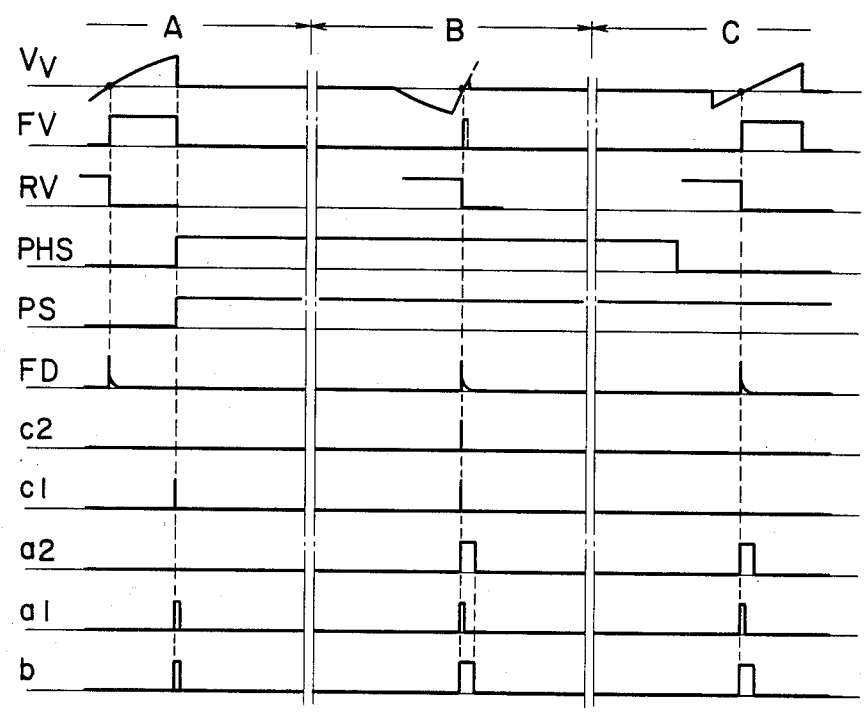
FIGS. 3, 5 and 7 are time charts used for the mode of operation of the gate pulse generators, respectively, shown in FIGS. 2, 4 and 6.

Next referring to FIG. 3, the mode of operation of the gate pulse generator described above with reference to FIG. 2 will be explained. An interval A in FIG. 3 shows the normal firing case or the first case and the forward voltage signal has been already generated prior to the generation of the gate command signal PHS. In this case, the logic AND condition for permitting the output signal is not satisfied in the AND gate 168, the pulse signal a2 having a wide pulse width cannot be obtained. In this case, the logic AND condition for permitting the delivery of the output is attained in the AND gate 164 so that only the pulse signal a1 with a narrow pulse duration is delivered from the one-shot multivibrator 165. An interval B shows the second case in which the direct current is interrupted. In this case, the forward voltage signal FV appears during the time interval during which the gate command signal PHS and the signal PS are generated so that the pulse signal a2 with a width pulse duration and the output signal b corresponding to the pulse signal a2 are derived.

An interval C shows the third case in which the forced firing is effected with an insufficient margin angle. That is, in this case, the gate command signal PHS and the signal PS continuously exists prior to the appearance of the forward voltage FV. Therefore the logic AND condition for permitting the delivery of the output is attained in the AND gate 168 so that the pulse signal a2 having a wide pulse duration is derived from the one-shot multivibrator 169. In this case, no pulse signal a1 having a wide pulse duration is derived from the AND gate 164 because of the interlocking signal applied through the inverter 171. The pulse signal a2 having a wide pulse duration is derived through the OR gate 167 and the pulse amplifier 166 as the output signal of the gate pulse generator. If required, the interlocking signal applied to the AND gate 164 through the inverter 171 can be eliminated. Then, the logic AND condition for permitting the delivery of the output signal is attained in each of AND gates 164 and 168 so that the pulse signal a1 having a narrow pulse duration and the pulse signal a2 having a wide pulse duration are derived and delivered to the OR gate 167. Therefore in response to the logic OR operation of the OR gate 167, the pulse signal b corresponding to the pulse signal with a wide pulse duration is derived from the gate pulse generator.

As described above, in the first case, the pulse signal with a narrow pulse duration is generated while in the second and third cases, the pulse signal having a wide pulse duration is derived. The normal operation almost corresponds to the first case so that the pulse signal with a narrow pulse duration is derived. As a result, the life of the light-emitting diodes 17 can be increased and a high-voltage-side gate power supply to which is supplied the power through the snubber circuit 4 can be made compact in size. The second and third cases occur on rare occasions, the pulse signal with a wide pulse duration can be generated satisfactorily by the charged voltage on the capacitor 11 (See FIG. 1).

According to the above-mentioned embodiment, in the case of the normal operation which occupies almost all the operation of the converter, the gate pulse signal with a minimum necessary pulse duration is delivered and if required, the gate pulse with a wide pulse duration can be generated temporarily so that while the ability of controlling the firing of the thyristors and of protecting them can be maintained substantially equal to that of the prior art system which normally generates the pulse signal having a wide pulse duration, the life of the light-emitting diodes can be increased and the high-voltage-side gate power supply can be decreased in capacity.

The differentiating circuit 170 shown in the embodiment of FIG. 2 can be replaced with a one-shot multivibrator, but the same performance with that of the embodiment shown in FIG. 2 can be attained. In this case, it suffices to determine the pulse duration TP0 from the one-shot multivibrator within the range from a few microseconds to 100 microseconds (that is, in general $TP1 < TP0 < TP2$). According to this modification, when the gate command signal PHS and the forward voltage signal FV are generated simultaneously, the pulse signal with a wide pulse duration can be obtained so that the safe firing of the thyristors can be ensured.

Figure 4:
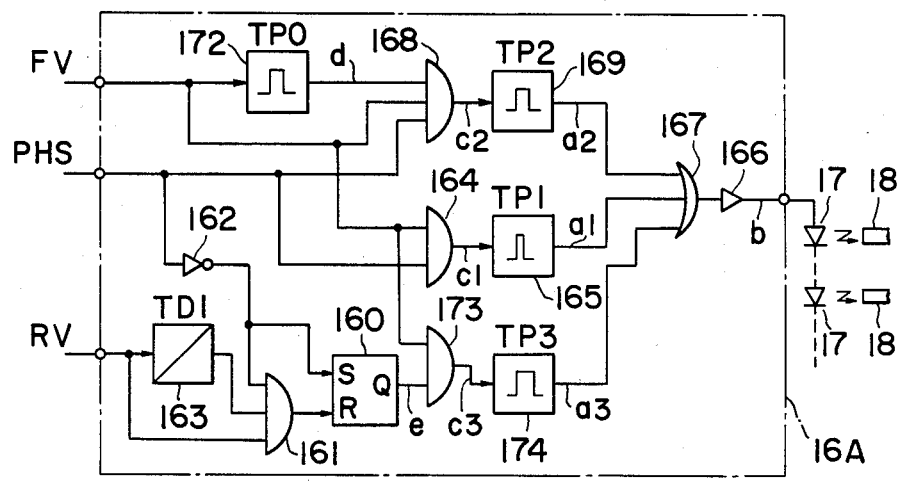

FIG. 4 shows another embodiment of the gate pulse generator in accordance with the present invention which is represented by the reference numeral 16A. In this embodiment, the gate pulse signal has a pulse duration of from 5 to 10 microseconds normally during the time interval A, of from 50 to 100 microseconds in the time interval B in which the direct current is interrupted and of from 200 to 300 microseconds in the time interval C when the forced firing is carried out in the case of an insufficient margin angle. Therefore, three one-shot multivibrators 165, 169 and 174 which deliver the output pulses with a pulse duration of TP1, a pulse duration of TP2 and a pulse duration of TP3, respectively, are connected to the input of the OR gate 167. The pulse widths are TP1 =5–10 microseconds, TP2 =50–100 microseconds and TP3 =200–300 microseconds. The oneshot multivibrators 165, 169 and 174 are triggered in response to the output signals, respectively, derived from the AND gates 164, 168 and 173. As in the case of the embodiment shown in FIG. 2, a first input signal to the AND gate 164 is the forward voltage signal FV, but the gate command signal PHS is directly applied as a second input signal to the AND gate 164. A first input signal applied to the AND gate 168 is the forward voltage signal FV and a second input signal applied thereto is a signal d obtained from the one-shot multi-vibrator 172 (whose pulse duration TP0 is of the order of from a few to one hundred microseconds) when the forward voltage signal FV is applied thereto. A third input signal of the AND gate 168 is the gate command signal PHS. A first input signal applied to the AND gate 173 is the forward voltage signal FV and a second input signal is the Q output signal e derived from the flip-flop 160. The flip-flop 160 is set in response to the gate command signal PHS inverted by the inverter 162 and is reset in response to the output of the AND gate 161. The three inputs of the AND gate 161 are the same as those in the embodiment shown in FIG. 2.

Figure 5:
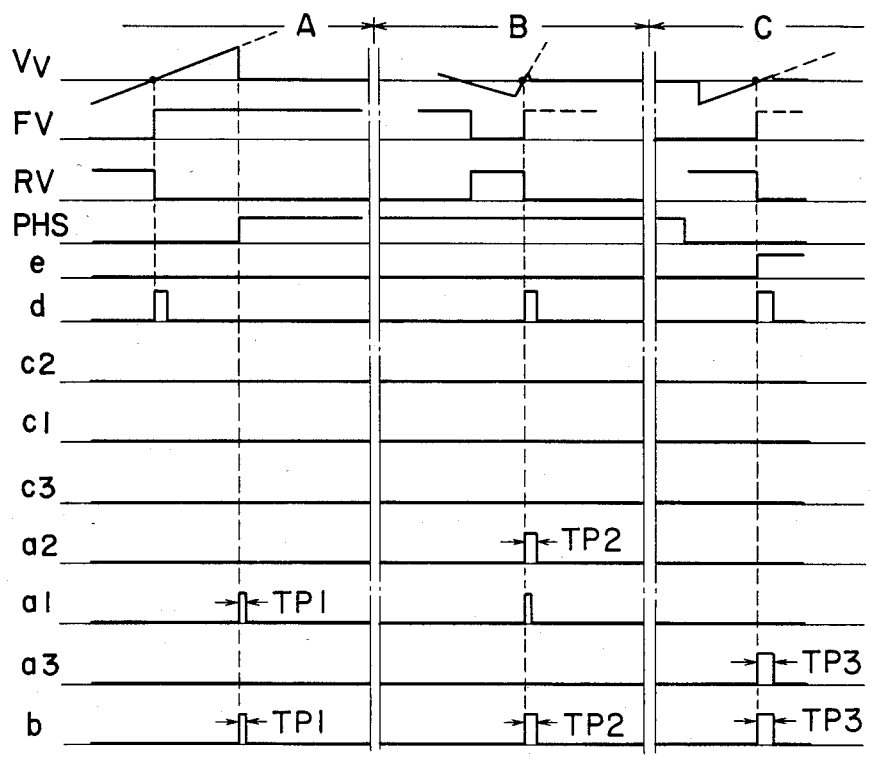

Referring next to the time chart shown in FIG. 5, the mode of operation of the second embodiment shown in FIG. 4 will be described. Just like the first embodiment described above with reference to FIG. 2, in the normal time interval A and in the time interval B during which the supply of the direct current is interrupted, the output pulse signal b with a pulse duration TP1 or TP2 depending upon the outputs from the one-shot multivibrators 165 and 169 is derived. During the interval C in which the margin angle is insufficient, when the reverse voltage signal RV appears after the disappearance of the gate command signal PHS and the reverse voltage duration is shorter than the on-delay time TD1 of the on-delay circuit 163, the AND condition of the AND gate 161 is not satisfied so that the flip-flop 160 is not reset and the output signal e is maintained. Therefore the pulse signal b with a wide pulse duration of TP3 for causing the forced firing is derived at the time point at which the forward voltage signal FV is generated.

In general, the frequencies of occurrence of the phenomena in the time intervals A, B and C are represented by P(A), P(B) and P(C) which have the following relation:

$$P(A) >> P(B) > P(C)$$

When the output pulse with a narrower pulse duration is used, the effects of the present invention can be further enhanced.

Figure 6:
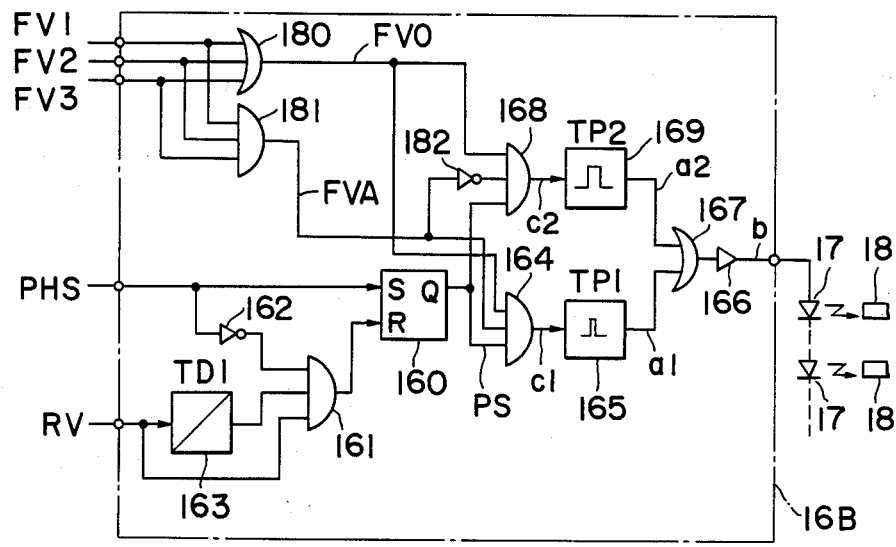

FIG. 6 shows a modification of the embodiment shown in FIG. 2. The gate pulse generator 16B receives the forward voltage detecting signals from n pieces of respective series-connected thyristors which constitute unit arm and applys them to an OR gate 180 and an AND gate 181 so that the OR output signal FVO and the AND output signal FVA are derived, respectively. In FIG. 6, typical embodiment of n=3 is shown. In this connection, three typical forward voltage signals FV1, FV2 and FV3 are shown. A first input signal applied to the AND gate 164 is the OR output signal FVO; a second input signal is the AND output signal FVA; and a third input signal is the Q output signal PS derived from the flip-flop 160. The remaining circuit structure is substantially similar to that of the embodiment shown in FIG. 2. The pulse durations TP1 and TP2 of the output pulses derived from the one-shot multivibrators 165 and 169 are:

TP1 ≃5–10 microseconds, and
TP2 ≃100–200 microseconds.

Figure 7:
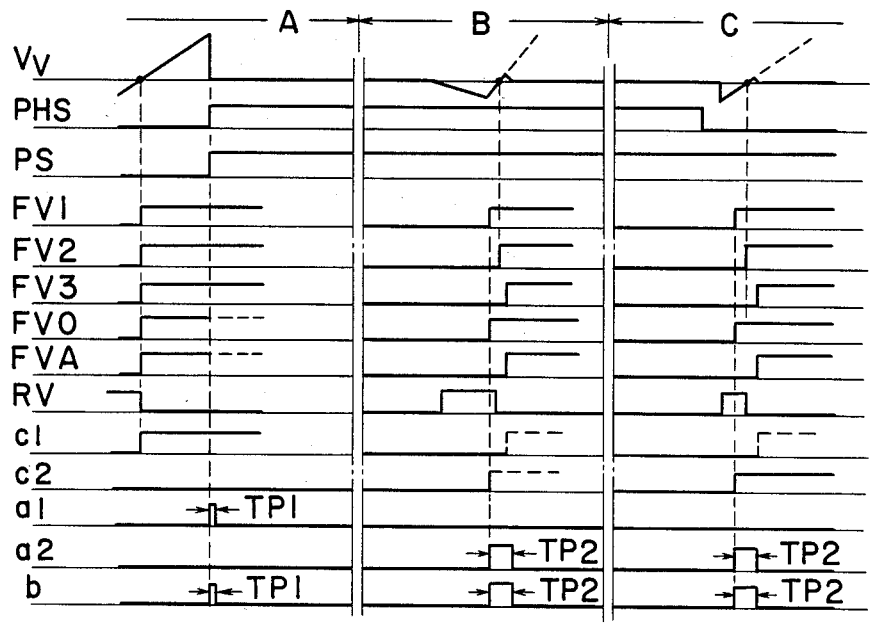

As shown in the time chart of FIG. 7, in the case of the circuit structure as shown in FIG. 6, during the normal firing time interval A, when the gate command signal PHS is generated, the OR output signal FVO and the AND output signal FVA associated with the forward voltage have been already present so that the output signal c1 is derived from the AND gate 164 and is applied to the oneshot multivibrator 165. As a result, the pulse signal a1 with a narrower pulse duration (TP1) is derived from the one-shot multivibrator 165 and delivered as the output signal b from the gate pulse generator 16B. In this case, the logic AND condition for permitting the delivery of the output is not established in the AND gate 168 so that the pulse signal a2 with a wider pulse duration is not generated. In the time interval B during which the operation is carried out when the direct current is interrupted and in the time interval C during which the forced firing is carried out at an insufficient margin angle, the voltage differences among the thyristors result due to the storage carrier differences, the rise time points of the forward voltage signals FV1, FV2 and FV3 vary from each other. As a result, the rise of the forward-voltage AND output signal FVA lags behind the rise of the forward-voltage OR output signal FVO. Therefore, in these cases, the gate command signal PHS has been already generated so that at the time point at which the forward voltage OR output signal FVO rises, the logic AND condition for permitting the delivery of the output is attained in the AND gate 168. As a consequence, the output c2 is derived from the AND gate 168 and is applied to the one-shot multivibrator 169 so that the pulse signal a2 with a wide pulse duration (TP2) is derived therefrom and delivered as the output signal b from the gate pulse generator 16B.

In this case, a further modification in which an on-delay circuit having a preset time delay of from a few to tens microseconds is connected to the output of the OR gate 180 may be considered. Then, in every case A, B or C, the forward-voltage OR output signal FVO is applied to the AND gates 164 and 168 as the OR output signal FVD which is delayed by TD. When such time-delay TD is produced and when there is almost no greater difference in time when the thyristors generate the forward-voltage signals as in the case of the operation with the interrupted direct current as shown in the time interval B, the time points at which the forward-voltage AND output signal and the OR output signal FVD are generated when viewed from the input side of the AND gate 168 can be made substantially equal to each other so that the logic AND condition for permitting the delivery of the output signal is not satisfied in the AND gate 168. As a consequence, the pulse signals a1 and b having a narrow pulse duration (TP1) are derived. In this manner, in the case of the operation with the interrupted direct current during the time interval B, the pulse with a narrow pulse duration can be generated.

When the time-delay TD becomes too long, an adverse effect causing the delay of the generation of a pulse results when it is desired to immediately deliver the gate pulse as in the case of the intrusion of an exterior lightning as the forward voltage. However, when the time-delay TD is limited to from a few to tens microseconds as described above, the gate pulse with a wide pulse duration can be derived in the manner described above in the case of the forced firing at an insufficient margin angle.

In the modification shown in FIG. 6, like the case of the embodiment shown in FIG. 4, three time durations TP1, TP2 and TP3 can be set correspondingly to three intervals A, B and C, respectively. In this case, the modification of FIG. 6 is provided with another AND gate with three inputs and another one-shot multivibrator as shown in the embodiment of FIG. 4. First and second inputs of the AND gate are the same as those of the AND gate 168, respectively and third input is the gate command signal PHS which is used instead of signal PS.

What is claimed is:

1. A gate pulse generator for a thyristor converter in which in order to fire thyristors of the thyristor converter in which each unit arm is composed of a plurality of series-connected thyristors, a gate pulse signal is generated in response to a gate command signal and a thyristor forward voltage signal and is converted into a light signal which in turn is transmitted to the thyristor converter, said gate pulse generator comprising:
   first pulse generator means for generating a gate pulse signal with a relatively narrow pulse duration;
   second pulse generator means for generating a gate pulse with a relatively wide pulse duration; and
   logic circuit means for delivering a gate pulse with a relatively narrow pulse duration from said first pulse generator means when the gate command signal is received after the thyristor forward voltage signal has been already generated and delivering a gate pulse signal with a relatively wide pulse duration from said second pulse generator means when the gate command signal has been already generated or when the gate command signal is generated simultaneously with the generation of the thyristor forward voltage signal.

2. A gate pulse generator as set forth in claim 1, wherein said logic circuit means comprises:
   a first AND gate which is disposed at the front stage of said first pulse generator means and responds to the forward voltage signal and the gate command signal;
   a differentiating circuit for differentiating the forward voltage signal;
   a second AND gate which is disposed at the front stage of said second pulse generator means and which responds to the gate command signal, the forward voltage signal and the output signal derived from said differentiating circuit; and
   an OR gate for deriving the logic OR output from the outputs from said first and second pulse generator means.

3. A gate pulse generator as set forth in claim 1, wherein said logic circuit means comprises:
   a first AND gate which is disposed at the front stage of said first pulse generator means and responds to the forward voltage signal and the gate command signal;
   a second AND gate which is disposed at the front stage of said second pulse generator means and responds to the gate command signal, the forward voltage signal and the output signal derived from an one-shot multivibrator; and
   an OR gate for obtaining a logic OR output from said outputs from said first and second pulse generator means.

4. A gate pulse generator as set forth in claim 1, wherein the input stage of a gate command signal includes a flip-flop which is set in response to the gate command signal and is reset in response to the inverted gate command signal, a thyristor reverse voltage signal and a logic AND signal obtained by delaying in time a thyristor reverse voltage signal.

5. A gate pulse generator as set forth in claim 1 wherein each of said pulse generator means comprises a one-shot multivibrator respectively.

6. A gate pulse generator as set forth in claim 2, wherein the input stage of a gate command signal includes a flip-flop which is set in response to the gate command signal and is reset in response to the inverted gate command signal, a thyristor reverse voltage signal and a logic AND signal obtained by delaying in time a thyristor reverse voltage signal.

7. A gate pulse generator as set forth in claim 3, wherein the input stage of a gate command signal includes a flip-flop which is set in response to the gate command signal and is reset in response to the inverted gate command signal, a thyristor reverse voltage signal and a logic AND signal obtained by delaying in time a thyristor reverse voltage signal.

8. A gate pulse generator for a thyristor converter in which in order to fire thyristors of the thyristor converter in which each unit arm is composed of a plurality of series-connected thyristors, a gate pulse signal is generated in response to a gate command signal and a thyristor forward voltage signal and is converted into a light signal which in turn is transmitted to the thyristor converter, said gate pulse generator comprising:

first pulse generator means for generating a gate pulse signal with a relatively narrow pulse duration;

second pulse generator means for generating a gate pulse signal with a relatively wide pulse duration;

a first AND gate for carrying out the logic AND operation of forward voltage signals from respective thyristors constituting a unit arm, thereby delivering a forward voltage AND signal; and logic circuit means for delivering a gate pulse signal with a relatively narrow pulse duration from said first pulse generator means when it receives a gate command signal after the forward AND signal has been already generated by said first AND gate and also delivering a gate pulse signal with a relatively wide pulse duration from said second pulse generator means when a gate command signal has been already generated or when the gate command signal is generated simultaneously with the generation of the forward voltage signal by said first AND gate.

9. A gate pulse generator as set forth in claim 8, wherein said logic circuit means comprises:

a first OR gate for carrying out the logic OR operation of forward voltage signals from respective thyristors constituting the unit arm, thereby delivering a forward voltage OR signal;

a second AND gate which is disposed at the front stage of said first pulse generator means and responds to the gate command signal, the output signal from said first AND gate and the output signal from said first OR gate;

a third AND gate which is disposed at the front stage of said second pulse generator means and responds to the output signal from said first OR gate, the output signal from said first AND gate which is inverted and the gate command signal; and a second OR gate for performing the logic OR operation of the output signals from said first and second pulse generator means, thereby delivering a logic OR output signal.

10. A gate pulse generator as set forth in claim 9, wherein an on-delay circuit is connected to the output of said first OR gate.

11. A gate pulse generator as set forth in claim 8, wherein the input stage of a gate command signal includes a flip-flop which is set in response to the gate command signal and is reset in response to the inverted gate command signal, a thyristor reverse voltage signal and a logic AND signal obtained by delaying in time a thyristor reverse voltage signal.

12. A gate pulse generator as set forth in claim 9, wherein the input stage of a gate command signal includes a flip-flop which is set in response to the gate command signal and is reset in response to the inverted gate command signal, a thyristor reverse voltage signal and a logic AND signal obtained by delaying in time a thyristor reverse voltage signal.

13. A gate pulse generator as set forth in claim 10, wherein the input stage of a gate command signal includes a flip-flop which is set in response to the gate command signal and is reset in response to the inverted gate command signal, a thyristor reverse voltage signal and a logic AND signal obtained by delaying in time a thyristor reverse voltage signal.

14. A gate generator as set forth in claim 8, wherein each of said pulse generator means comprises a one-shot multivibrator respectively.

15. A gate pulse generator for a thyristor converter in which in order to fire thyristors of the thyristor converter in which each unit arm is composed of a plurality of series-connected thyristors, a gate pulse signal is generated in response to a gate command signal and a thyristor forward voltage signal and is converted into a light signal which in turn is transmitted to the thyristor converter, said gate pulse generator comprising:

first pulse generator means for generating a gate pulse signal with a relatively narrow pulse duration;

second pulse generator means for generating a gate pulse signal for generating a gate pulse with a relatively wide pulse duration;

third pulse generator means for generating a gate pulse with a pulse duration which is between said pulse signal with a relatively narrow pulse duration and said pulse signal with a relatively wide pulse duration; and logic circuit means for delivering a gate pulse signal with a relatively narrow pulse duration from said first pulse generator means when the gate command signal is received after the thyristor forward voltage signal has been already generated, delivering a gate pulse signal with an intermediate pulse duration from said third pulse generator means when it receives the thyristor forward voltage signal after the gate command signal has been already generated and delivering a gate pulse with a relatively wide pulse duration from said second gate pulse generator means in the case of the forced firing at an insufficient margin angle.

16. A gate pulse generator as set forth in claim 15, wherein said logic circuit means comprises:

a one-shot multivibrator triggered in response to the forward voltage signal;

an on-delay circuit triggered in response to the reverse voltage signals of the thyristors constituting the unit arm;

a first AND gate for receiving an inverted gate command signal, a reverse voltage signal and the output signal from said on-delay circuit;

a flip-flop which is set in response to the gate command signal and is reset in response to the output signal from said first AND gate;

a second AND gate which is disposed at the front stage of said first pulse generator means and responds to the forward voltage signal and the gate command signal;

a third AND gate which is disposed at the front stage of said second pulse generator means and responds to the forward voltage signal and the output signal from said flip-flop;

a fourth AND gate which is disposed at the front stage of said third pulse generator means and responds to the forward voltage signal, the gate command signal and the output signal derived from said one-shot multivibrator; and an OR gate for performing the logic OR operation of the output signals derived from said first, second and third pulse generator means, thereby delivering a logic OR output signal.

17. A gate pulse generator as set forth in claim 15, wherein said logic circuit means comprises:

an on-delay circuit triggered in response to the reverse voltage signals of the thyristors constituting the unit arm;

a first AND gate for receiving an inverted gate command signal, a reverse voltage signal and the output signal from said on-delay circuit;

a flip-flop which is set in response to the gate command signal and is reset in response to the output signal from said first AND gate;

a first OR gate for carrying out the logic OR operation of forward voltage signals from respective thyristors constituting the unit arm, thereby delivering a forward voltage OR signal;

a second AND gate for carrying out the logic AND operation of forward voltage signals from respective thyristors constituting a unit arm, thereby delivering a forward voltage AND signal;

a third AND gate which is disposed at the front stage of said first pulse generator means and responds to the output signal from said first OR gate, the output signal from said second AND gate and the output signal from said flip-flop;

a fourth AND gate which is disposed at the front stage of said second pulse generator means and responds to the output signal from said first OR gate, the output signal from said second AND gate which is inverted and the output signal from said flip-flop;

a fifth AND gate which is disposed at the front stage of said third pulse generator means and responds to the output signal from said first OR gate, the output signal from said second AND gate and the output signal from said flip-flop; and a second OR gate for performing the logic OR operation of the output signals derived from said first, second and third pulse generator means, thereby delivering a logic OR output signal.

18. A gate generator as set forth in claim 15, wherein each of said pulse generator means comprises a one-shot multivibrator respectively.

* * * * *